Figure 1:
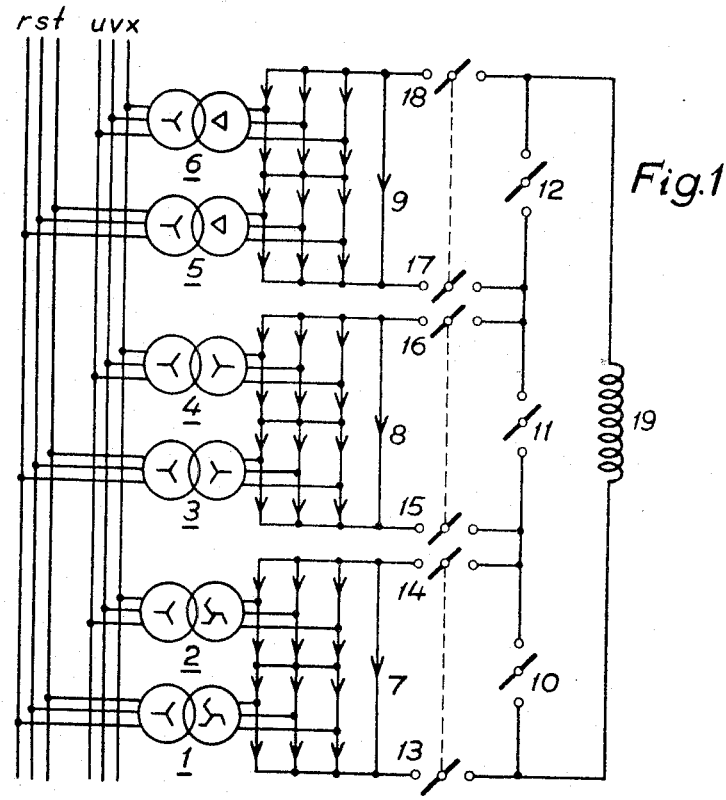

INVENTORS
Erich Uhlmann
Iwan Hedlund
BY
Bailey, Stephens & Huettig
ATTORNEYS

Oct. 18, 1966   E. UHLMANN ETAL   3,280,334
MEANS FOR CONNECTING ALTERNATING CURRENT NETWORKS
Filed Feb. 3, 1966   2 Sheets-Sheet 2

INVENTORS
ERICH UHLMANN
IWAN HEDLUND
BY
Bailey, Stephens + Huettig
ATTORNEYS

United States Patent Office 3,280,334
Patented Oct. 18, 1966

3,280,334
MEANS FOR CONNECTING ALTERNATING CURRENT NETWORKS
Erich Uhlmann and Iwan Hedlund, Ludvika, Sweden, assignors to Allmanna Svenska Elektriska Aktiebolaget, Vasteras, Sweden, a Swedish corporation
Filed Feb. 3, 1966, Ser. No. 534,597
Claims priority, application Sweden, Mar. 14, 1961, 2,685/61
4 Claims. (Cl. 307—83)

This application is a continuation-in-part of application Ser. No. 178,076, filed Mar. 7, 1962, now abandoned.

The present invention relates to a converter station for connecting two alternating current networks, adjacent to each other, which networks may have a different number of phases and/or different frequencies. The invention also relates to the connection of two A.C. networks which are normally the same but which for some reason may not be connected at synchronism.

Two separate alternating networks may be connected with the aid of two different converter stations, one of which operates as rectifier station while the other operates as an inverter station. Both the converter stations are in this case connected with two direct current conductors and each of the stations may consist of a number of series-connected converts. Thus the direct current conductors will operate with relatively high voltage, which is an advantage if there is a considerable distance between the two converter stations and great power is to be transmitted between the stations. If, on the other hand, the two converter stations are placed at the same place, which may be the case when the two A.C. networks are adjacent to each other, there is no need for the high voltage which necessitates a strong and expensive insulation of the direct current part of the system.

Such high voltage may be avoided if the converters are arranged in pairs with one rectifier and one inverter in each pair and a separate direct current circuit for each pair. However, this requires a smoothing filter such as a reactor for each pair of converters, so that the advantage gained through the lower voltage is problematic.

By means of the present invention it is possible to operate with low voltage on the direct current side while still only one reactor is necessary for an arbitrary number of converters and a converter station for the purpose of the invention comprises a number of pairs of converters, one of such pair operating as a rectifier and the other operating as an inverter. All the rectifiers of the station are connected to one of the two alternating current networks while all the inverters are connected to the other alternating current network, and all pairs of converters are connected in series on the D.C. side. As the E.M.F.'s of all rectifiers in a D.C. transmission system are opposite to the E.M.F.'s of the inverters, it is seen that the D.C. voltage across each pair of converters will be substantially zero, and within a pair the D.C. voltage between two points will never exceed the E.M.F. of one converter. Thus the D.C. voltage in the converter station will be much lower than that of a conventional system with separate rectifier and inverter stations. Further the direct current sides of all the pairs of converters may be series-connected through a common smoothing reactor.

In a converter station according to the invention an advantage is gained compared to conventional systems where the converters are divided between a rectifier station and an inverter station. In such stations the separate converters should be parallel-connected, each to its own by-pass valve and a short-circuiting means; and, for each converter, isolating switches should be inserted to disconnect the converter and the corresponding by-pass valves. In a station according to the invention each pair of converters may instead have one by-pass valve and one short-circuiting means and also the corresponding isolating switches are common to a pair of converters, thus halving the number of by-pass valves, short-circuiting means and isolating switches in comparison with the known device.

Another feature of the invention is to phase displace the converters connected to one alternating current network in relation to each other. In this way the pulse rate in the smoothing reactor is increased so that better use is made of this reactor and the dimensions may therefore be smaller.

Figure 2:
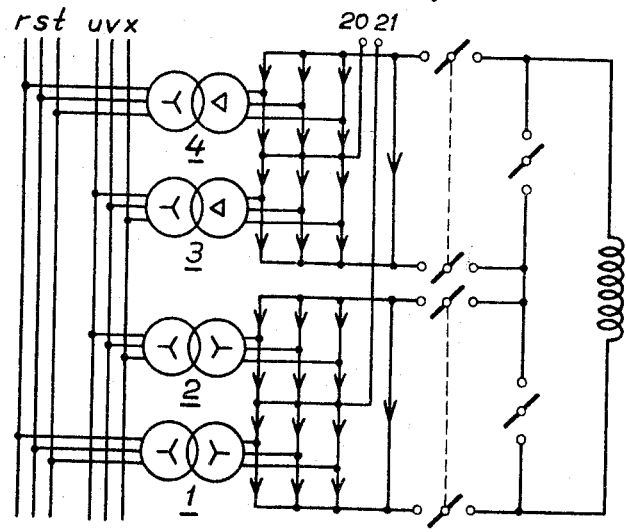
Figure 1A:
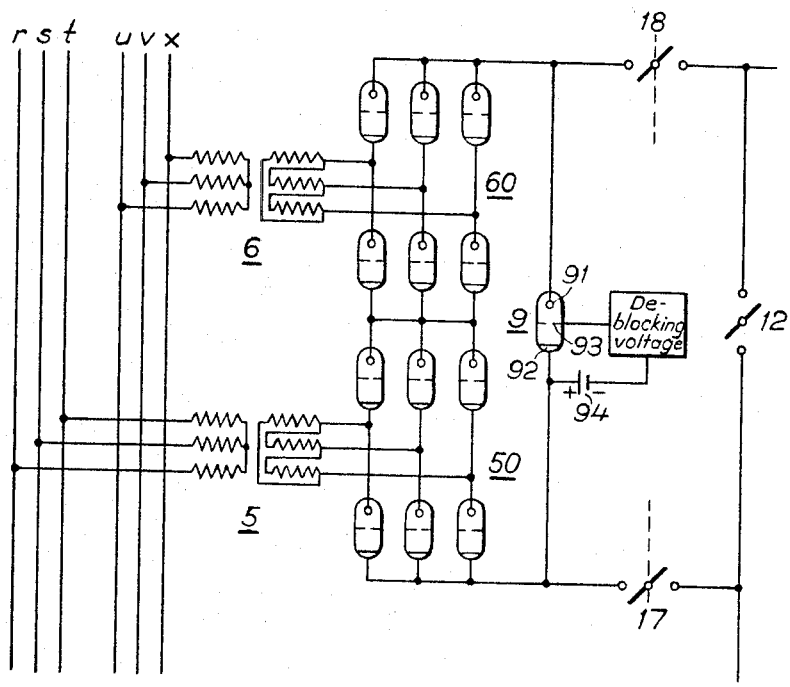
Figure 1B:
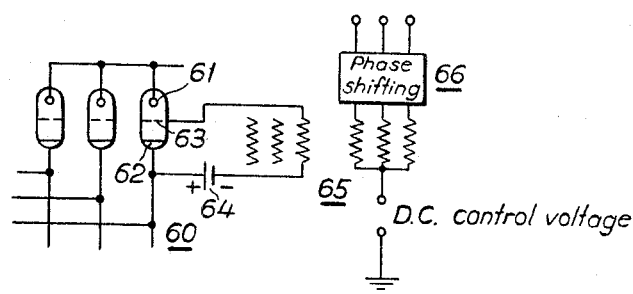

The invention will be more fully described with reference to the accompanying schematical drawings wherein FIGURE 1 shows a converter station according to the invention for connecting two alternating current networks by means of an arbitrary number of converter pairs; FIGURE 1a shows in detail a part of FIGURE 1; FIGURE 1b shows the control circuit for the rectifier bridge; while FIGURE 2 shows a variation of the invention with only two pairs of converters.

FIGURE 1 shows two alternating current networks $rst$ and $uvx$ connected with the aid of three pairs of converters 1–6, each comprising 6 valves in double-way 6-pulse connection. The converters are arranged in pairs and those indicated by odd numbers are connected to the network $rst$ while those having even numbers are connected to the network $uvx$. The converters are provided, each with its own converter-transformer, and the transformers connected to one network are phase displaced in relation to each other on their valve sides by using different connections in the windings connected to the valves. For instance, all the transformers 1, 3 and 5 connected to the A.C. network $rst$ are Y-connected on the network side, while on the valve side 1 is Z-connected, 3 is Y-connected and 5 is D-connected. All the pairs of converters are connected in series over a common smoothing reactor 19. The reactor is traversed by direct current from the converters and takes up alternating voltages dependent upon the harmonics in these converters. The common reactor is in itself an advantage, but by phase-displacing the valve sides of the converter-transformers as shown the pulse rate of the reactor is increased, whereby the dimensions of the reactor may be decreased. Each pair of converters is parallel-connected on the direct current side to a by-pass valve 7, 8, 9 and to a short-circuiting device 10, 11, 12. Between each by-pass valve and the corresponding short-circuiting means are inserted two isolating switches 13, 14, 15, 16, 17 and 18.

With the help of the by-pass valves and short-circuiting means shown, and the isolating switches, it is possible to disconnect any pair of converters from the closed D.C. circuit of the converter station so that the station can continue its normal operation while one of the converter pairs is disconnected. The station shown has the advantage compared with the conventional system where the rectifiers and inverters are arranged in two separate stations, that each pair of converters is provided with a by-pass valve common for the pair, while with the known systems each converter must have its own by-pass valve.

FIGURE 1a shows the converters 5 and 6 of FIGURE 1 and with the same reference numerals. The rectifier bridges of the two converters are 50 and 60 respectively. The by-pass rectifier 9 is shown with its anode 91, cathode 92 and control grid 93. Between the cathode and the control grid is inserted a blocking voltage source 94 in series with a deblocking voltage source 95.

During normal operation the by-pass rectifier 9 is blocked by said blocking voltage source, making the cathode 92 positive in relation to the control grid 93, but, by activating the deblocking voltage source 95 in case of a fault in a converter, this deblocking voltage will give a voltage opposite to and greater than the blocking voltage so that the control grid of the by-pass rectifier will become positive in relation to the cathode and the by-pass rectifier will be conducting and take over the direct current of the two converters. After this the corresponding short circuiting switch 12 is closed so that said pair of converters with their by-pass rectifier can be disconnected from the D.C. circuit by means of the isolators 17 and 18.

In FIGURE 1b is shown the upper part of the rectifier bridge 60 with its control circuit giving the delay angles for the rectifiers. The control circuit is only drawn completely for one of the rectifiers having an anode 61, a cathode 62 and a control grid 63. Between the cathode and the control grid is inserted a blocking voltage source 64 in series with a secondary phase winding of a three-phase grid voltage transformer 65. On the primary side this transformer is connected to the A.C. network $uvx$ for converter 6 through a phase shifting device 66 so that the control system for the rectifiers is provided with an A.C. reference voltage with a desired phase position in relation to the A.C. network $uvx$. The neutral point of the primary side of transformer 65 is connected to earth through a variable D.C. control voltage source which can be varied between the positive and negative amplitude values of the phase voltages $uvx$. In this way the phase angles for the zero points of the primary base voltages of transformer 65 can be varied within a range of 180°. The transformer 65 is formed like a pulse transformer so that when a primary phase voltage passes through zero a peak voltage is induced in the corresponding secondary winding giving an ignition pulse greater than and opposite to the blocking voltage of the corresponding rectifier which will thereby be ignited. By varying said D.C. control voltage from a negative to a positive value, the corresponding converter is transferred from rectifier to inverter operation or vice versa, there being no difference in principle in the construction and function of a rectifier equipment and an inverter.

In FIGURE 2 is shown a converter station according to the invention with only two pairs of converters 1, 2, 3, 4. If one network $uvx$ is a feeding network while the other network $rst$ is fed, the converters 2 and 3 will operate as rectifiers. Further, if the converters are arranged as shown it is possible to measure the total direct voltage over the outputs 20, 21, for example for controlling the installation or for some other purpose. Otherwise this connection is the same as the connecton in FIGURE 1.

While we have described herein some embodiments of our invention, we wish it to be understood that we do not intend to limit ourselves thereby except within the scope of the claims hereto or hereinafter appended.

We claim:
1. Converter station for connecting two A.C. networks adjacent to each other, said converter station comprising at least two pairs of converters; one converter of each pair operating as a rectifier and the other converter as an inverter; means connecting the A.C. side of all said converters operating as rectifiers to one of said A.C. networks; means connecting the A.C. side of all said converters operating as inverters to the other A.C. network; and means connecting the D.C. sides of all said pairs of converters in series in a closed D.C. circuit; each pair of converters having a by-pass rectifier connected on its D.C. side; a short circuiting means connected in parallel with each by-pass rectifier; isolating switches for each pair of converters for disconnecting said pair of converters together with the connected by-pass rectifier from said closed D.C. circuit; said closed D.C. circuit comprising said short circuiting means.

2. In a converter station as claimed in claim 1; the means connecting the D.C. sides of all said pairs of converters in series including a common reactor.

3. In a converter station as claimed in claim 1, the different converters connected to one A.C. network being phase displaced in relation to each other.

4. In a converter station as claimed in claim 1; said converter station comprising only two pairs of converters; the means connecting the D.C. sides of the two pairs of converters connecting the two converters operating as rectifiers adjacent to each other; outputs on the D.C. sides of said two pairs of converters; said outputs being arranged between the two converters of a pair; and measuring means between said outputs; said measuring means measuring the total D.C. voltage of the converter station.

References Cited by the Examiner

UNITED STATES PATENTS

| | | | |
|---|---|---|---|
| 1,990,758 | 2/1935 | Stone | 321—2 |
| 1,990,759 | 2/1935 | Stone | 321—2 |
| 2,202,726 | 5/1940 | Bedford | 321—2 |
| 2,224,645 | 12/1940 | Eichberg | 321—2 |
| 2,832,029 | 4/1958 | Forsell | 321—2 |

ORIS L. RADER, *Primary Examiner.*

T. J. MADDEN, *Assistant Examiner.*